United States Patent [19]

Steele

[11] Patent Number: 4,936,043
[45] Date of Patent: Jun. 26, 1990

[54] LIVE BAIT CONTAINER INCORPORATING AERATOR AND POWER SUPPLY

[76] Inventor: John J. Steele, 14022 Walters Rd. #8100, Houston, Tex. 77014

[21] Appl. No.: 355,997

[22] Filed: May 23, 1989

[51] Int. Cl.$^5$ ............................................. A01K 97/04
[52] U.S. Cl. ............................................. 43/57; 43/55
[58] Field of Search ............................... 43/55, 56, 57; 262/121.2; 200/561

[56] References Cited

U.S. PATENT DOCUMENTS

| | | | |
|---|---|---|---|
| 2,639,906 | 5/1953 | Butler | 43/57 |
| 2,936,542 | 5/1960 | Butler | 43/57 |
| 3,815,277 | 6/1974 | Murray | 43/57 |
| 3,822,498 | 7/1974 | Butler | 43/57 |
| 4,168,590 | 9/1979 | Beshoner | 43/55 |
| 4,462,180 | 7/1984 | Scott | 43/57 |
| 4,615,137 | 10/1986 | Radmanovich | 43/57 |
| 4,677,785 | 7/1987 | Lambourn | 43/55 |

*Primary Examiner*—Kurt Rowan
*Attorney, Agent, or Firm*—Gunn, Lee & Miller

[57] ABSTRACT

A bait container in the form of a foamed plastic chest and lid is disclosed. A solar cell assembly is positioned on the lid; conductors extend to the lid to metal foil contact strips on the nether side of the lid. A pair of matching metal strips for contact purposes is located on the upper peripheral lip of the chest. The metal contacts connect with conductors to a motor and the motor connects with a pump to remove pump from the chest, to pump the water through a feedline and into a header to be sprayed into the chest.

12 Claims, 1 Drawing Sheet

LIVE BAIT CONTAINER INCORPORATING AERATOR AND POWER SUPPLY

BACKGROUND OF THE DISCLOSURE

The present disclosure is directed to a container for stowing live fishing bait such as minnows or shrimp. More particularly, it is a type of bait box constructed of an insulative material intended to exclude heat and having a removable lid. The box contains a pump and header with spray nozzles for distributing water. The water is sprayed out of the header through the nozzles back into the lower portions of the chest or housing so that the water is aerated, absorbing oxygen to raise the oxygen concentration in the water. Accordingly, the equipment within the chest or housing includes a submerged pump with a motor, the pump having an inlet and outlet. The inlet is at the bottom surrounded by a screen to exclude trash, and the outlet connects with an upstanding line which connects to the header. The header is clamped to a side wall, supported on appropriate mounting hooks, and has a number of nozzle or spray outlets for water distribution. The apparatus further includes a power system for furnishing electrical power to operate the motor for the pump. The preferred form of the apparatus incorporates a generally rectangular insulated wall chest. It is open at the top end so that a separate lid can be placed over the top, the lid having a surrounding lower lip to nest in the chest, shouldering up to close the interior, and is preferably formed of insulating material. The top surface supports a rectangular array of solar cells typically in a mounting block. The solar cells form output current delivered through a pair of conductors through the lid or top, the conductors extending to the bottom face of the lid. The nether side of the lid is equipped with a pair of conductive metal strips glued to the nether side. In similar fashion, the top internal edge of the chest has a pair of metal strips which are glued or otherwise adhesively attached. They are located so that they match the location of the two metal strips on the lid. When the lid is placed on the chest, the pairs of strips match and contact, forming an electrical contact. So to speak, the lid fits snuggly into the chest to assure suitable metal to metal contact by the strips. This provides current transfer from solar cells on the lid through the metal strip contacts and then to the motor for operation. No switch is required in the system because the lid can be removed to break the circuit. The lid can be installed so that the metal strips do not make contact.

The aeration of the water in continued fashion raises and sustains the oxygen concentration in the water so that live bait in the bait container will live much longer. Conveniently, the fishermen can easily remove the lid which momentarily breaks the circuit, reach into the container, retrieve live bait as needed, and thereafter reinstall t he lid. External heat is excluded, keeping the water cooler and enabling fresh water to sustain the life of the bait much longer. If fact, in the absence of aerated water and without regard to thermal insulation provided by the present disclosure, the bait will simply not live very long. Even worse, should one of the minnows or shrimp die, without aeration, the remainder will typically die very quickly as a result of the death of the first.

Many advantages and virtues will be noted regarding the present apparatus. It is intended to be a lightweight container system for water for holding live bait. The weight which is added to the system is minimal. In particular, heavy batteries are not needed or required. In particular, electrical power is furnished continuously so long as there is external illumination for the system. External illumination is furnished normally by sunlight so that the bait box in ordinary use is simply exposed to the sun. Even cloud cover does not seriously reduce aeration of the water.

While the foregoing speaks generally of the present apparatus, details of construction and features of the apparatus will become more readily apparent upon the consideration of the detailed description in conjunction with the drawings which is found below:

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
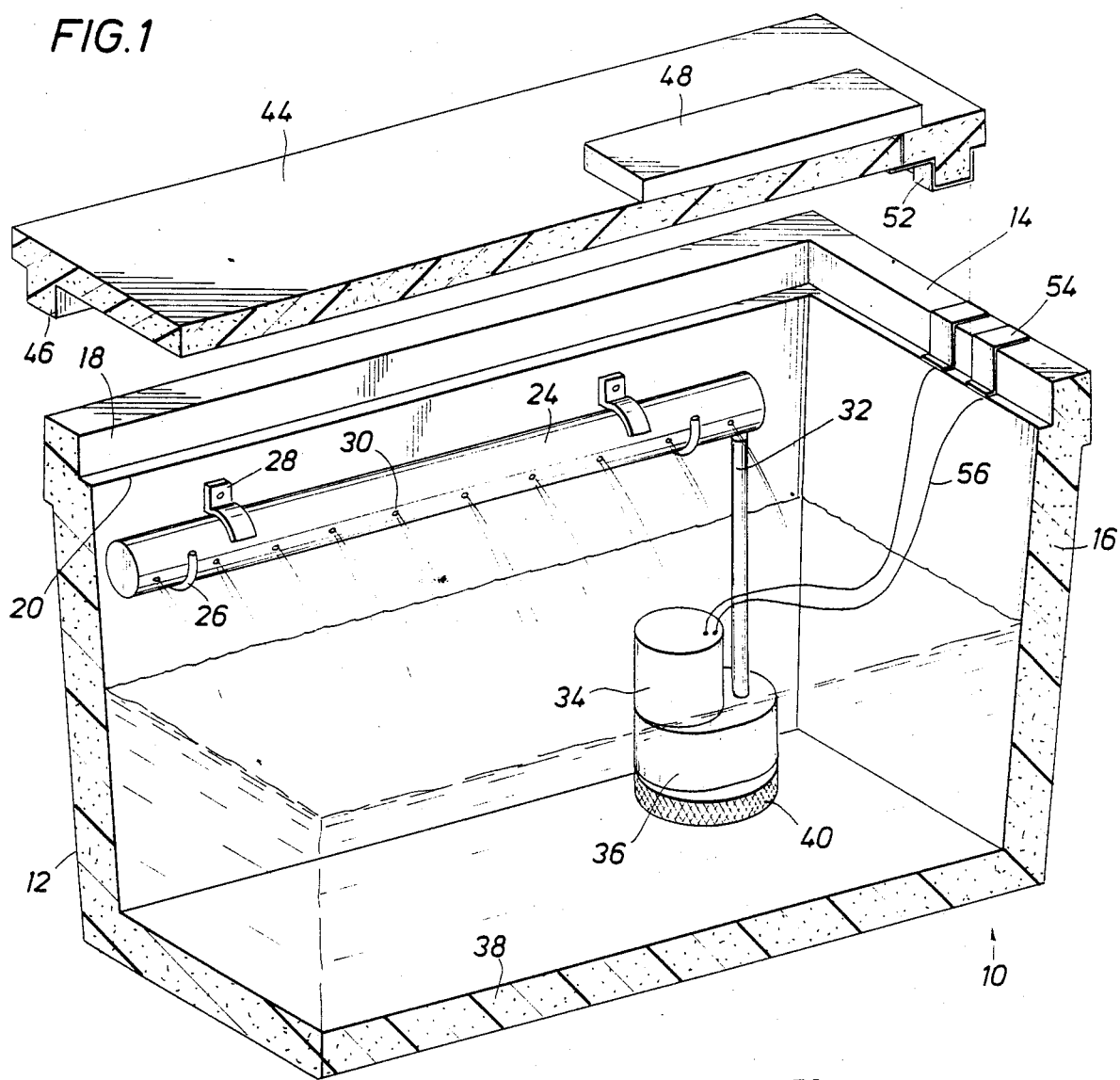
FIG. 1 is a sectional cut away view of the bait container of the present disclosure showing the lid spaced above the container and illustrating details of construction of the electrical power system for operating the water aeration system.

Attention is directed first to FIG. 1 of the drawing where the numeral 10 identifies the live bait container of the present disclosure, an apparatus which in particular includes means for aerating the water in the container. The present apparatus includes a thick wall insulated chest 12 which is shown in sectional view, the chest having an upstanding wall terminating at a top shoulder 14. It is preferably rectangular in cross-section, and is formed of four walls, an end wall being identified at 16. The wall 16 slopes, and all of the walls slope so that several of the chests can be stacked and nested after manufacture. The top shoulder is adjacent to an internal shoulder 18. That is immediately adjacent to a stop shoulder 20 which is incorporated to limit entry of the lid to be described. The arrangement of the shoulders defines a surrounding peripheral lip of reinforced construction for structural strength and integrity. A lid to be described nests against this surrounding reinforced lip to close over the top of the chest 12.

On the interior, a water header 24 is supported against one of the side walls. It is secured on a set of hooks 26 which hold the header in place. The header is held in place by suitable clamps 28 at various locations along the length of the header. The header is drilled with a number of ports 30 which function as nozzles to spray water into the chest. The header is closed at both ends. Water is delivered into the header by a supply line 32. The supply line extends down towards the bottom of the chest 12.

Figure 2:
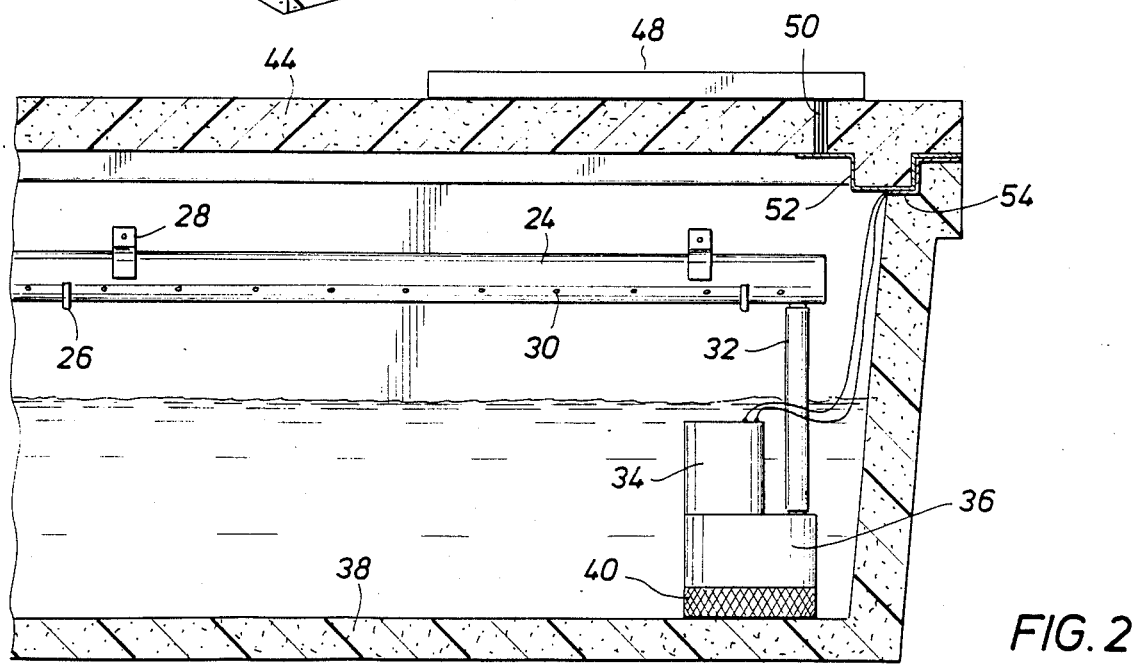
FIG. 2 is a sectional view through the container and lid showing the lid nested against the container to make electrical contact so that power is furnished from the solar cells to the pump for pumping water for aeration.

FIG. 2 shows a sealed motor 34 which provides rotational power to a pump 36. The pump has an outlet port connected with the line 32 so that water is delivered through the line into the header. Moreover, the pump has a bottom located water inlet. The pump is raised above the floor 38 of the chest 12, and trash which might otherwise enter the pump is prevented from entry by a screen 40 which surrounds the lower portions of the pump. In this arrangement, water flows through the screen and into the pump inlet. The pump is affixed to the floor 38 by means of a suitable adhesive or alternatively by fastening the pump 36 to an upstanding tab (not shown) which is appropriately located as an anchor for the pump. Water is drawn into the pump 36 and is forced out through the line 32 for the header.

Going now to FIG. 1 of the drawings, a lid 44 is illustrated, the lid having a finite thickness, and is preferably rectangular in shape to fit over the chest 12. It is constructed with a protruding lower bead 46 on the bottom face which encircles the structure so that the bead 46 nests against the shoulders 18 and 20 of the chest. This limits entry of the lid into the chest. Moreover, the interlocking shoulder arrangement shown in FIG. 1 positions the lid so that the chest is totally closed when the lid is placed on the chest. The lid has a rectangular exposed top expanse; this area is used to support a solar cell assembly 48 which is a large thin block of solid construction attached to the lid. It is exposed at this location to sunlight for operation. Moreover, it forms an electrical current output which is delivered through the lid by means of conductors at 50, the conductors extending through the lid 44. Two conductors extend separately through the lid to connect separately to spaced metal foil strips 52 better shown in FIG. 1. There are two such strips. They are adhesively attached to the lower side of the lid, extending over the bead 46 and having a shape conforming to the underside of the lid. The foil strips are adhesively secured in location. They are made of conductive metal so that they are electrical contacts. They are spaced and located on the lid so that proper conductive contact is made by the two strips at 52 with a pair of strips 54. The strips 54 are attached to the chest 12. They are adhesively joined on the top shoulder 14 and extend over on the shoulders 18 and 20. The strips 54 serve as electrical contacts for the pair of strips on the lid, and in turn connect with conductors at 56 which extend to the motor 34. The conductors 56 complete an electrical circuit so that current is able to flow to the motor 34. In other words, the solar cell assembly 48 serves as a current source, and the current flows through the lid and into the two metal contacts at 52, and continues through the contacts 54 so that a complete circuit is connected between solar cell assembly 48 and the motor 34.

As long as light impinges on the solar cell assembly, the motor 34 is operated. No switch is incorporated in the system. A switch function however is accomplished by making and breaking contacts 52 and 54. When the lid 44 is closed against the chest 12 as shown in FIG. 2, electrical contact is made and current flows so long as the lid is in the closed position. When the lid is opened, the circuit is broken and there is no current flow. The lid is thus always able to be stored where the motor is operated or not operated. For instance, the lid can be installed in the position shown in FIG. 2 for operation; it can be rotated so that the contacts are separated but closure can still be obtained by positioning the lid on the chest where the contacts of the lid are at the opposite end of the chest. Recall that the chest and lid are rectangular; this deployment of lid contacts at the opposite end of the chest breaks the circuit.

Operation of the present apparatus is accomplished in the following manner. The lid is removed and the chest is filled approximately half or two thirds deep in water. Minnows or shrimp are placed in the chest. The lid is then closed onto the chest by nesting the lid against the shoulders 14, 18 and 20 so that the lid covers over the chest. On exposure of the solar cell assembly 48 to light, current is generated. The current flows to the motor 34, operates the motor and in turn operates the pump. Water is drawn into the inlet through the screen 40 and is pumped up through the feedline 32. Water is delivered into the header 24 and is sprayed through the nozzle openings 30 to aerate the water. As the water sprays in spray or mist form, it picks up oxygen out of the air in the chest. The oxygen is dissolved into the water so that the oxygen concentration of the water is raised. It is raised and thereby extends the life of the shrimp or minnows in the water. Even better, should some of the minnows or shrimp die, those that remain will be protected because the continued aeration of the water extends their life. The aeration of water helps prevent poisoning as a result of death of even one shrimp or minnow.

The chest is an insulated chest and is preferably formed of a closed cell plastic foam structure. The same is true of the lid. If desired, the chest and the lid both can be made of the same material. Material such as a closed cell layer of the formed plastic material is preferably incorporated to prevent water from seeping into the foam plastic material which makes up the chest 12 and the lid 44.

As a mater of scale, the present structure can be increased or decreased in size or scale. Moreover, the present system can be enhanced by furnishing multiple pump motors operated by multiple solar cell assemblies. Duplication of the equipment is desirable for extra large storage chests. The chest can be made in many sizes such as small, medium and large sizes, typical sizes being about 10, 25 and 100 quarts. In those instances, the chest may require increased thickness of wall and some measure of reinforcing in the wall to have structural integrity for holding that much water.

I claim:

1. A bait container for holding a quantity of water and keeping live bait in the water, the container comprising:
    (a) container means having cooperative upper and lower portions, said upper and lower portions joining together to define a closed container means having a chamber therein for receiving water and live bait in the water, said upper and lower portions being separable from one another to enable access from the exterior into said container means;
    (b) a water distribution means in said container means having a water inlet for receipt of water under pressure and outlet means thereon for spraying water from said outlet means under pressure wherein the sprayed water is recirculated into said container means, and wherein the water during spraying absorbs oxygen from the air to raise the concentration of oxygen dissolved in the water;
    (c) submerged motorized pump means for drawing water thereinto and for delivery of the water to said water distribution means for spraying water therefrom in said container means;

(d) solar cell means mounted on said container means and having an exposed area for viewing a light source so that light impinging thereon is converted into electrical current flow; and (e) conductor means connected from said solar cell means to said motorized pump means for delivery of electrical current thereto for operation of said pump means.

2. The apparatus of claim 1 wherein said solar cell means mounts in planar parallel position on a lid and has an exposed surface to sunlight falling thereon, and said solar cell means connects with said conductor means extending from said solar cell means through said lid to the nether side thereof.

3. The apparatus of claim 2 wherein said lid incorporates a surrounding nether located shoulder and comprises the upper portion of said container means, said shoulder cooperatively engaging a matching and mating shoulder on the lower portion of said container means to thereby enable said lid to close with said lower portion, and further including a pair of spaced electrical contacts which contact between said lid and said lower portion.

4. The apparatus of claim 3 wherein said contacts make on closure of said lid with said lower portion and break on removal of said lid from said lower portion.

5. The apparatus of claim 4 wherein said lid includes a downwardly extending bead on the lower side thereof and located for cooperative contact against mating shoulders on said lower portion, and said lower portion has a pair of fixed spaced conductive contacts on the upper edges thereof.

6. The apparatus of claim 1 wherein said upper and lower portions of said lower container means are formed of insulated material of a selected thickness sufficient to hold a volume of water therein for keeping live bait.

7. The apparatus of claim 6 wherein said upper and lower portions are formed of closed cell foamed plastic material.

8. The apparatus of claim 1 wherein said water distribution means comprises an elongate header mounted on a wall of said lower portion and said motorized pump means has an inlet and outlet thereof, and further including a feed line connecting from the outlet thereof to said header for the delivery of water under pressure through said pump means.

9. The apparatus of claim 1 wherein said upper and lower portions of said container means form coacting shoulders arranged as a rectangular lid and a mating rectangular lower housing portion, and said lower portion has a depth sufficient to receive a measured quantity of water therein but the water does not cover a header means for aerating water which is sprayed into said lower portion.

10. A power source for a bait box comprising:
(a) a live bait box for receiving a quantity of water therein for holding live bait, and further including motorized pump means in the water for drawing water into said pump means for delivery under pressure through an outlet of said pump means;
(b) overhead water distribution means for delivery of water through air in the space above the water to enable water aeration;
(c) external power source means for delivery of electrical power to said pump means;
(d) electrical conductors deployed between said pump means and said electrical power source wherein said electrical conductors comprise a pair of conductors extending through switch means mounted on said box and said switch means comprises means opening and closing in a switching function on opening and closing of said live bait box to permit access to the interior thereof.

11. The apparatus of claim 10 wherein said external power source comprises a solar cell means.

12. The apparatus of claim 11 wherein said solar cell is mounted on said bait box.

* * * * *